UNITED STATES PATENT OFFICE.

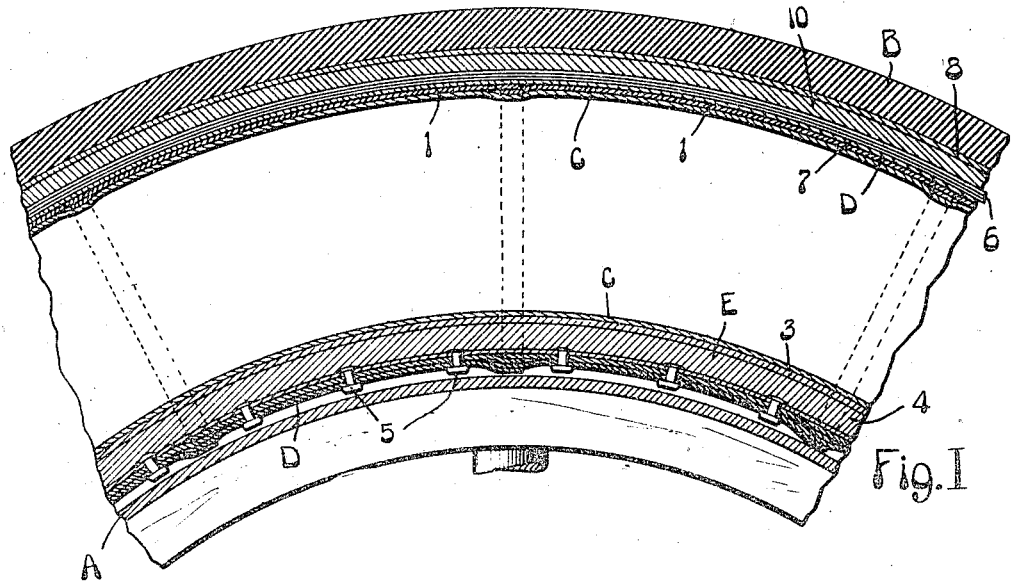
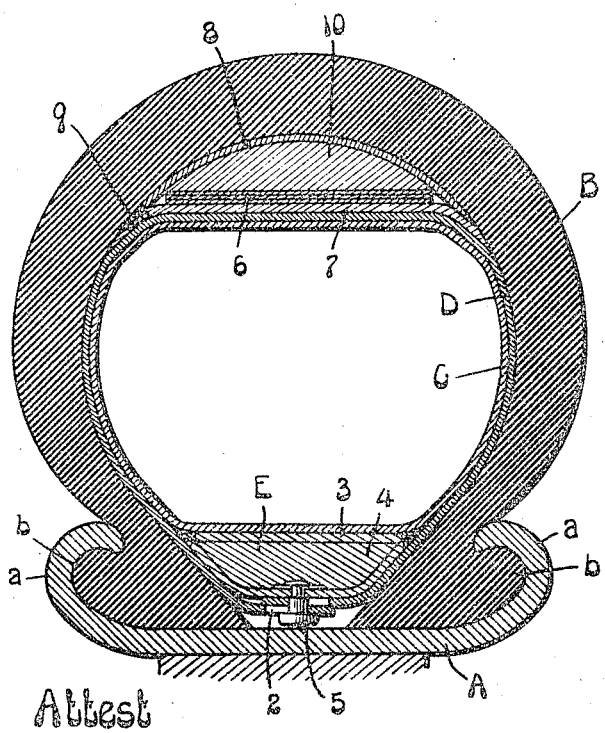

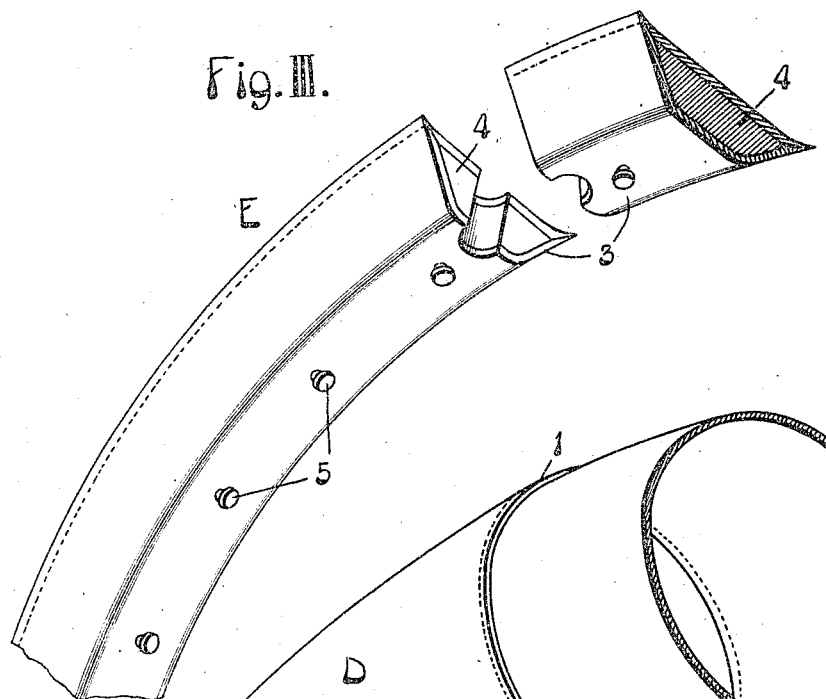

MARK A. DEES, OF PASCAGOULA, MISSISSIPPI.

PNEUMATIC TIRE.

999,302.

Specification of Letters Patent. Patented Aug. 1, 1911.

Application filed September 12, 1910. Serial No. 581,519.

*To all whom it may concern:*

Be it known that I, MARK A. DEES, a citizen of the United States of America, residing at Pascagoula, in the county of Jackson and State of Mississippi, have invented certain new and useful Improvements in Pneumatic Tires, of which the following is a full, clear, and exact description, reference being had to the accompanying drawings, forming part of this specification.

My invention relates to a pneumatic tire for use on vehicle wheels.

The principal object of my present invention is to provide a protector envelop by which the inner inflatable tube of a pneumatic tire is effectually incased to prevent what are commonly known as "blow-outs" and to connect the separable edges of such envelop so that the envelop will not be susceptible of distention, but will effectually confine the inner tube within it.

A further object of the invention is to so construct the inner tube incasing envelop as to provide for its separable edges being connected at a point where the envelop is subject to the least, or no disturbance in the use of the pneumatic tire in which it is utilized.

A further object of the invention is to provide in a pneumatic tire casing and inner tube incasing envelop a unitary member by which said envelop is effectually held at the point where its separable edges are joined, and which serves also as a means for spreading the beads of the tire casing to their proper positions in the tire receiving rim of the wheel on which the pneumatic tire is used.

Figure I is a longitudinal section through a fragment of a vehicle wheel and my pneumatic tire. Fig. II is a cross section through my tire and the tire receiving rim. Fig. III is a perspective view of fragments of the spreader ring entering into the construction of my tire. Fig. IV is a perspective view of a fragment of the inner tube incasing envelop. Fig. V is a side elevation on a reduced scale of a puncture proof band used in my pneumatic tire.

In the accompanying drawings: A designates the tire receiving rim of a vehicle wheel; this rim being provided with the usual inturned side flanges $a$.

B is the tire casing provided with the usual beads $b$ adapted to seat within the inturned flanges of the wheel rim A.

C is the inner inflatable tube of the tire, located within the casing B.

D designates my inner tube incasing envelop. This envelop is preferably composed of a plurality of sections 1, joined together by stitches, and it is preferably made of rawhide or leather, although it may be made of any other suitable flexible material. The envelop is of continuous, or ring, shape conforming to the inner tube it incases, and it has separable edges located at its inner circle, the envelop being provided adjacent to said edges with button-holes 2 adapted to receive fastening means to be presently particularly referred to.

E designates a spreader ring interposed between the inner tube C and the portions of the tube incasing envelop at its inner circle so that said ring is in position to serve, in addition to an office it performs in connection with the tire incasing envelop, as a spreader whereby the beads $b$ of the tire casing B are spread outwardly in the tire receiving rim A and held in their proper positions in said rim. This spreader ring E preferably comprises a casing 3 and a core 4 within said casing, the core being preferably of some solid material of a flexible nature that will permit of the spreader yielding to a certain degree when it is subjected to pressure imposed thereon by the inner tube in the tire, in order that the spreader ring will adapt itself to the parts adjacent thereto in such degree as to cause it to exert its proper holding influence upon the portions of the tire casing fitted to the tire receiving rim, and also upon the inner portions of the tire incasing envelop D. The spreader ring is supplied with a series of buttons 5 corresponding in number to the number of pairs of button-holes 2 in the envelop D, arranged in meeting relation, and the said envelop is connected at its edges to said spreader ring by the passage of said buttons through said button-holes, as most clearly seen in Fig. II, whereby the envelop is rendered a complete tube of ring shape by which the inner inflatable tube C is positively incased to prevent more than a predetermined maximum degree of distention of said inflatable tube. The inflatable tube is, therefore, so guarded as to eliminate all possibility of such distention as will result in the occurrence of excessive air pressure therein at any point, and the "blowing out" of the inner tube is rendered impossible. The buttons 5 are preferably mounted in the casing of the spreader ring E, as shown in the drawings, so that they are located remote from the inner tube C, and said inner tube is protected from injury by said buttons due to the existence of the core of the spreader ring between the tube and the buttons.

I will next proceed to the description of the puncture proof device entering into my pneumatic tire. This device comprises a single helical strip 6 of flexible material, preferably steel, wound into a plurality of coils, the outermost of which overlie the innermost coil. These coils are free of any connection with each other, and they provide an expansible and contractible puncture proof band which, when placed circumferentially of the tire between the tread of the casing and the inner inflatable tube, is susceptible of expanding and contracting according to the distention or partial relaxation of the tire. The band, therefore, accommodates itself to the condition of the tire while at the same time it is always in such condition as to effectually prevent puncturing of the inner tube in the event of the passage of any sharp instrument through the tread of the tire. The band shaped puncture proof strip 6 is inclosed within an inner layer 7 of suitable material and an outer layer 8, preferably joined together at one edge, as seen at 9, the layer 7 serving to prevent injury to the tire incasing envelop D by the puncture proof strip 6, while the outer layer of material 8 serves to protect the tire casing B from injury by said puncture proof strip.

10 is a pad located between the puncture proof strip 6 and the outer protector layer 8, this pad being interposed at the point named to afford the proper contour of the tire opposite the tread of the tire casing.

I claim:

1. In a pneumatic tire, the combination of an outer casing, an inner tube, an envelop within said outer casing incasing said inner tube, having separable edges at its inner circle, a ring within the inner circle of said envelop, and means carried on the inner side of said ring to which the separable edges of said envelop are connected.

2. In a pneumatic tire, the combination of an outer casing, an inner tube, an envelop within said outer casing incasing said inner tube, having separable edges at its inner circle provided with button holes, a ring within the inner circle of said envelop, and buttons carried on the inner side of said ring to which the button holes of the separable edges of said envelop are connected.

MARK A. DEES.

In the presence of—
M. C. HAMMON,
E. B. LINN.